(12) United States Patent
Hu et al.

(10) Patent No.: US 11,498,531 B2
(45) Date of Patent: Nov. 15, 2022

(54) BRAKE MECHANISM, POWER PLATFORM AND KARTING

(71) Applicant: Ninebot (Changzhou) Tech Co., Ltd., Jiangsu (CN)

(72) Inventors: Zhicheng Hu, Jiangsu (CN); Dekun Kong, Jiangsu (CN); Ji Lin, Jiangsu (CN)

(73) Assignee: Ninebot (Changzhou) Tech Co., Ltd., Jiangsu (CN)

( * ) Notice: Subject to any disclaimer, the term of this patent is extended or adjusted under 35 U.S.C. 154(b) by 0 days.

(21) Appl. No.: 16/976,073

(22) PCT Filed: Dec. 29, 2018

(86) PCT No.: PCT/CN2018/125585
§ 371 (c)(1),
(2) Date: Aug. 26, 2020

(87) PCT Pub. No.: WO2019/205715
PCT Pub. Date: Oct. 31, 2019

(65) Prior Publication Data
US 2021/0370889 A1    Dec. 2, 2021

(30) Foreign Application Priority Data

Apr. 27, 2018  (CN) .......................... 201820627019.2

(51) Int. Cl.
*B60T 1/04*       (2006.01)
*B62D 21/18*      (2006.01)
(Continued)

(52) U.S. Cl.
CPC .............. *B60T 1/04* (2013.01); *B62D 21/183* (2013.01); *F16D 49/16* (2013.01); *B60Y 2200/114* (2013.01); *F16D 2125/70* (2013.01)

(58) Field of Classification Search
CPC ..... B60T 1/04; B62D 21/183; F16D 2125/70; F16D 49/16; B60Y 2200/114
See application file for complete search history.

(56) References Cited

U.S. PATENT DOCUMENTS 5,497,856 A * 3/1996 Block ................. B60B 33/0081
188/1.12
5,671,829 A * 9/1997 Rivera .................... F16D 49/00
188/171
(Continued)

FOREIGN PATENT DOCUMENTS

CN        104670183 A      6/2015
CN        204688088 U     10/2015
(Continued)

*Primary Examiner* — Melanie Torres Williams
(74) *Attorney, Agent, or Firm* — Gang Yu

(57) ABSTRACT

Some embodiments of the disclosure provide a brake mechanism, a power platform and a karting. The brake mechanism includes a brake assembly. The brake assembly is configured to be mounted on a vehicle frame, the brake assembly includes a brake pad, a position of the brake pad is adjustably configured, such that the brake pad has a first position and a second position. Herein, when the brake pad is located at the first position, the brake pad is configured to be in contact with a tire, and when the brake pad is located at the second position, the brake pad is separated from the tire.

14 Claims, 2 Drawing Sheets

(51) Int. Cl.
*F16D 49/16* (2006.01)
*F16D 125/70* (2012.01)

(56) References Cited

U.S. PATENT DOCUMENTS

| | | | | |
|---|---|---|---|---|
| 6,655,503 | B1 * | 12/2003 | Moody | A61G 5/10 |
| | | | | 188/2 F |
| 7,320,473 | B1 * | 1/2008 | Bennett | B60T 1/04 |
| | | | | 188/2 F |
| 2002/0153207 | A1 * | 10/2002 | Otaola Amirola | B60T 1/04 |
| | | | | 188/2 F |
| 2012/0090926 | A1 * | 4/2012 | Dunlap | F16D 63/006 |
| | | | | 188/68 |

FOREIGN PATENT DOCUMENTS

| | | | | | |
|---|---|---|---|---|---|
| CN | 204894979 | U | | 12/2015 | |
| CN | 106809320 | A | | 6/2017 | |
| DE | 102007022375 | A1 | * | 11/2008 | B60T 1/04 |
| DE | 102009044169 | B3 | * | 2/2011 | A61G 5/101 |
| DE | 102013215689 | A1 | * | 2/2015 | B60T 7/102 |

* cited by examiner ably disposed, such that the brake pad has a first position and a second position. Wherein, when the brake pad is located at the first position, the brake pad is in contact with a tire, and when the brake pad is located at the second position, the brake pad is separated from the tire.

BRAKE MECHANISM, POWER PLATFORM AND KARTING

CROSS-REFERENCE TO RELATED APPLICATION(S)

The present disclosure is a national stage application of International Patent Application No. PCT/CN2018/125585, which is filed on Dec. 29, 2018, and claims priority to Chinese Patent Application No. 201820627019.2, filed on Apr. 27, 2018 and entitled "Brake Mechanism, Power Platform and Karting", the contents of which are hereby incorporated by reference in its entirety.

TECHNICAL FIELD

The disclosure relates to a field of brake mechanisms, and in particular to a brake mechanism a power platform and a karting.

BACKGROUND

Two types of brake mechanisms, including a disk brake mechanism and a drum brake mechanism, are generally taken as a brake system structure of an electric vehicle known to inventors. Wherein, the disc brake mechanism includes brake pads fixed on two sides of a brake disc of a wheel respectively, a brake cylinder piston pushes the brake pads to clamp the brake disc on two sides, to achieve braking accordingly. The drum brake mechanism includes two arc brake pads provided in a drum cavity, and a brake cable pulls the two arc brake pads by making use of a lever principle to be in contact with an inner surface of a hub, to achieve frictional braking accordingly.

SUMMARY

Some embodiments of the present disclosure provide a brake mechanism, a power platform and a karting, to solve the problem that the brake mechanism known to inventors has poor braking effect.

According to a first aspect of some embodiments of the present disclosure, a brake mechanism is provided, including: a brake assembly. The brake assembly is mounted on a vehicle frame. The brake assembly includes a brake pad, and a position of the brake pad is adjustably disposed, such that the brake pad has a first position and a second position. Wherein, when the brake pad is located at the first position, the brake pad is in contact with a tire, and when the brake pad is located at the second position, the brake pad is separated from the tire.

According to a second aspect of some embodiments of the present disclosure, a power platform is provided, including a brake mechanism, a vehicle frame and a power mechanism. The brake mechanism is the abovementioned brake mechanism and provided on the vehicle frame. The power mechanism is connected with the vehicle frame in a driving manner.

According to a third aspect of some embodiments of the present disclosure, a karting is provided, including a power platform. The power platform is the abovementioned power platform.

Additional aspects and advantages of the present disclosure will be given in part in the following descriptions, become apparent in part from the following descriptions, or be learned from the practice of the present disclosure.

BRIEF DESCRIPTION OF THE DRAWINGS

The accompanying drawings described herein are used to provide a further understanding of the disclosure, and constitute a part of the application, and the exemplary embodiments of the disclosure and the description thereof are used to explain the disclosure, but do not constitute improper limitations to the disclosure. In the drawings.

Figure 1:
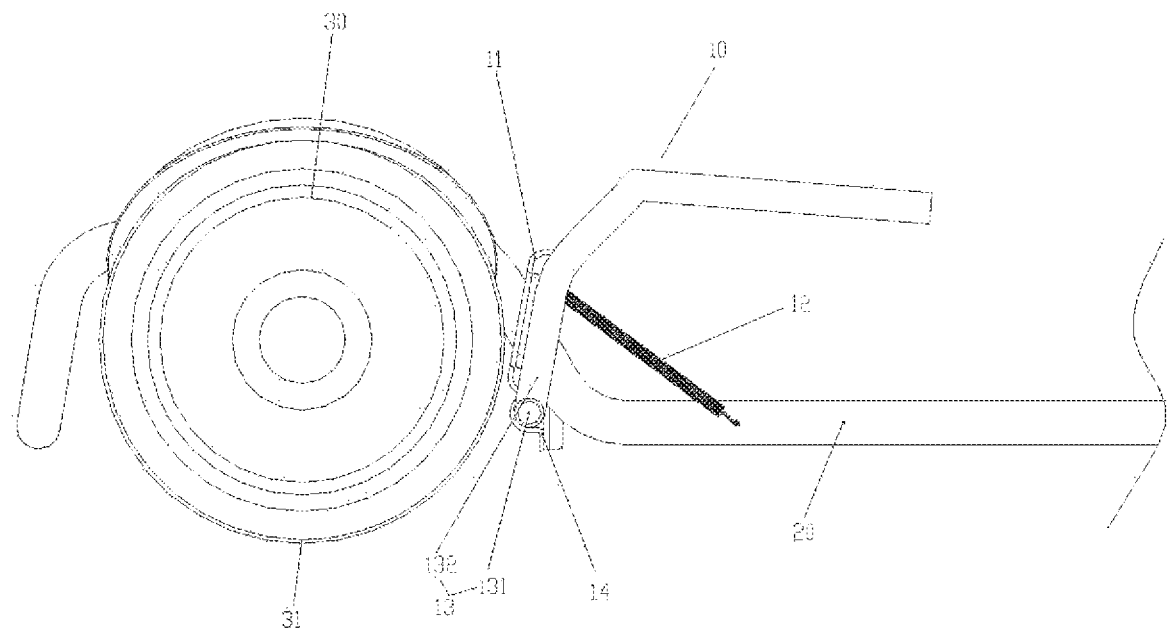
FIG. 1 illustrates a structure diagram of a brake pad of a brake mechanism according to the disclosure at a second position.

Herein, the abovementioned drawings may include the following reference numbers:

10, brake assembly; 11, brake pad; 12, elastic member; 13, drive part; 131, connecting shaft; 132, drive rod; 1321, first rod section; 1322, second rod section; 1323, third rod section; 14, connecting part; 141, fixed block; 142, chucking plate; 20, vehicle frame; 30, power mechanism; 31, tire.

DETAILED DESCRIPTION OF THE EMBODIMENTS

It is to be noted that embodiments in the disclosure and features in the embodiments may be combined with each other without conflict. The disclosure will be described below in detail with reference to drawings and in combination with the embodiments.

It should be pointed out that the detailed description below are exemplary and intended to provide further description of the application. Unless otherwise indicated, all technical and scientific terms used herein have meanings identical with those generally understood by those of ordinary skill in the art of the application.

It should be noted that terms used herein are merely intended to describe specific embodiments rather than limit exemplary embodiments of the application. Unless otherwise pointed out expressly, a singular form used used herein is also intended to include a plural form. In addition, it should also be understood that term "contain" and/or "include" used in the description indicates that there are features, steps, operations, devices, assemblies and/or combinations thereof.

Some embodiments of the present disclosure provide a brake mechanism. By referring to FIG. 1 to FIG. 4, the brake mechanism includes: a brake assembly 10. The brake assembly 10 is mounted on a vehicle frame 20. The brake assembly 10 includes a brake pad 11, and a position of the brake pad 11 is adjustably provided, such that the brake pad 11 has a first position and a second position. Wherein, when the brake pad 11 is located at the first position, the brake pad 11 is in contact with a tire 31, and when the brake pad 11 is located at the second position, the brake pad 11 is separated from the tire 31.

The brake mechanism of some embodiments better brakes the tire 31 by the brake pad 11 of the brake assembly 10. During specific use, the brake assembly 10 is mounted on the vehicle frame 20. When the tire 31 operates normally, the brake pad 11 is located at the second position separated from the tire 31. When the tire 31 needs to be braked, the position of the brake pad 11 is adjusted, such that the brake pad 11 is located at the first position which is in contact with the tire 31. At the moment, the tire 31 stops in presence of frictional force between the brake pad 11 and the tire 31. The brake mechanism better brakes the tire 31 by the brake pad 11 of the brake assembly 10, thereby solving the problem that the brake mechanism known to inventors has poor braking effect.

In allusion to a specific contact position of the brake pad 11 and the tire 31, in some embodiments, when the brake pad 11 is located at the first position, the brake pad 11 is in contact with an outer tire surface of the tire 31.

In an exemplary embodiment, when the brake pad 11 is located at the first position, the brake pad 11 is in contact with a tire surface of the tire 31 contactable with the ground.

In an exemplary embodiment, when the brake pad 11 is in contact with the tire 31, the braking effect is generated. The greater an angle of rotation of the brake pad 11 is, the larger a contact area between the brake pad 11 and the tire 31 will be, and the greater generated braking force will be.

In an exemplary embodiment, when the brake pad 11 is located at the first position, namely, the brake pad 11 brakes the tire 31, a contact surface of the tire 31 used to be in contact with the brake pad 11 is the tire surface of the tire 31 contactable with the ground. In presence of this type of braking mode, the braking effect is better, and frictional force of the tire surface is also equal to frictional force with the ground.

In an exemplary embodiment, the brake pad 11 is in direct contact with the tire 31, thereby generating better brake effect.

Because a certain gap is formed between the brake pad 11 and the tire 31, the brake mechanism of the disclosure is adaptable to tires with different diameters.

For enabling the brake pad 11 to have the first position and the second position, the brake pad 11 is rotatably provided relative to the vehicle frame 20, such that the brake pad 11 has the first position and the second position.

In an exemplary embodiment, the brake pad 11 is rotatably provided relative to the vehicle frame 20, in this way the brake pad 11 is rotated to be used at the first position which is in contact with the tire 31 and at the second position which is separated from the tire 31.

In some embodiments, when the tire 31 operates normally, the brake pad 11 is located at the second position where the brake pad 11 is separated from the tire 31. When the tire 31 needs to be braked, the brake pad 11 is rotated, such that the brake pad 11 is located at the first position which is in contact with the tire 31, and the tire 31 stops under an action of the frictional force between the brake pad 11 and the tire 31.

In an exemplary embodiment, the brake pad 11 is made from a metal plate through bending.

In an exemplary embodiment, as an alternative, the brake pad 11 is made from surface vulcanized rubber and other materials.

For making the brake pad 11 automatically return to an original position upon completion of braking, in some embodiments, as shown in FIG. 1 to FIG. 4, the brake assembly 10 includes an elastic member 12. One end of the elastic member 12 is connected with the brake pad 11, and another end is connected with the vehicle frame 20. The elastic member 12 is telescopic, to provide driving force driving the brake pad 11 to move to the second position from the first position.

In the embodiment, the brake assembly 10 is provided with the elastic member 12, wherein, the one end of the elastic member 12 is connected with the brake pad 11, and another end is connected with the vehicle frame 20.

In an exemplary embodiment, the elastic member 12 is telescopic, so that the elastic member 12 returns to an original position when the tire 31 stops under an action of the frictional force between the brake pad 11 and the tire 31. At the moment, the brake pad 11 moves to the second position from the first position under an action of elastic force of the elastic member 12.

In an exemplary embodiment, when the tire 31 operates normally, the brake pad 11 is located at the second position which is separated from the tire 31. At the moment, the elastic member 12 is in a natural state, and when the tire 31 needs to be braked, the brake pad 11 is rotated, such that the brake pad 11 is located at the first position which is in contact with the tire 31, and the tire 31 stops under an action of the frictional force between the brake pad 11 and the tire 31. At the moment, the elastic member 12 is in a stretched state, and when the driving force to the brake pad 11 is removed, the elastic member 12 returns to an original position. At the moment, the brake pad 11 moves to the second position from the first position under the action of the elastic force of the elastic member 12.

Figure 3:
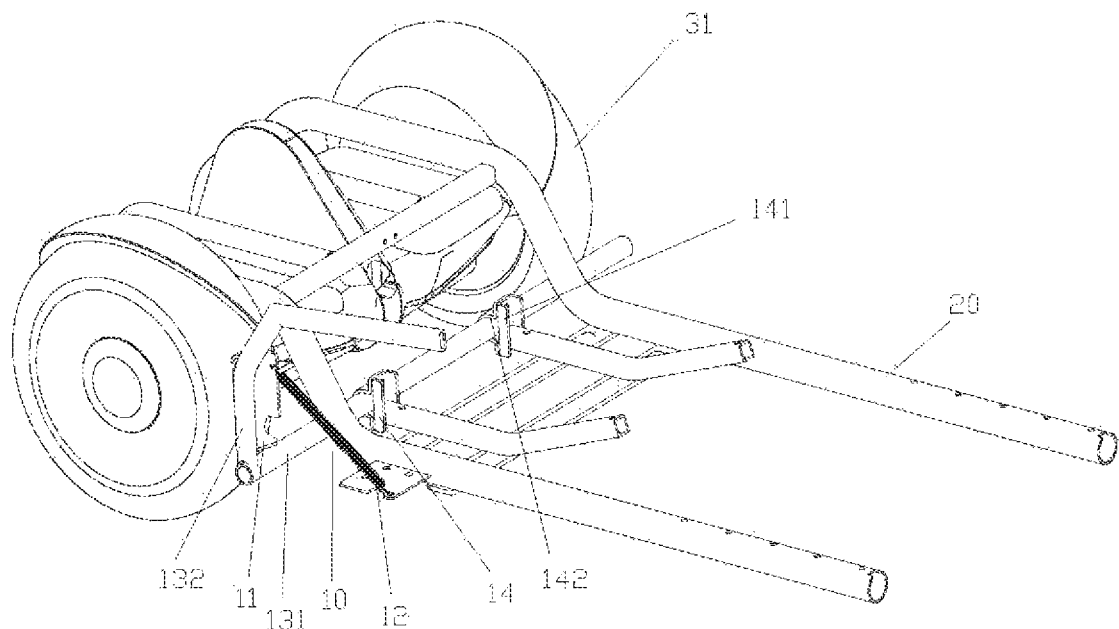
FIG. 3 illustrates a stereo diagram of a first viewing angle of a brake mechanism according to the disclosure.
Figure 4:
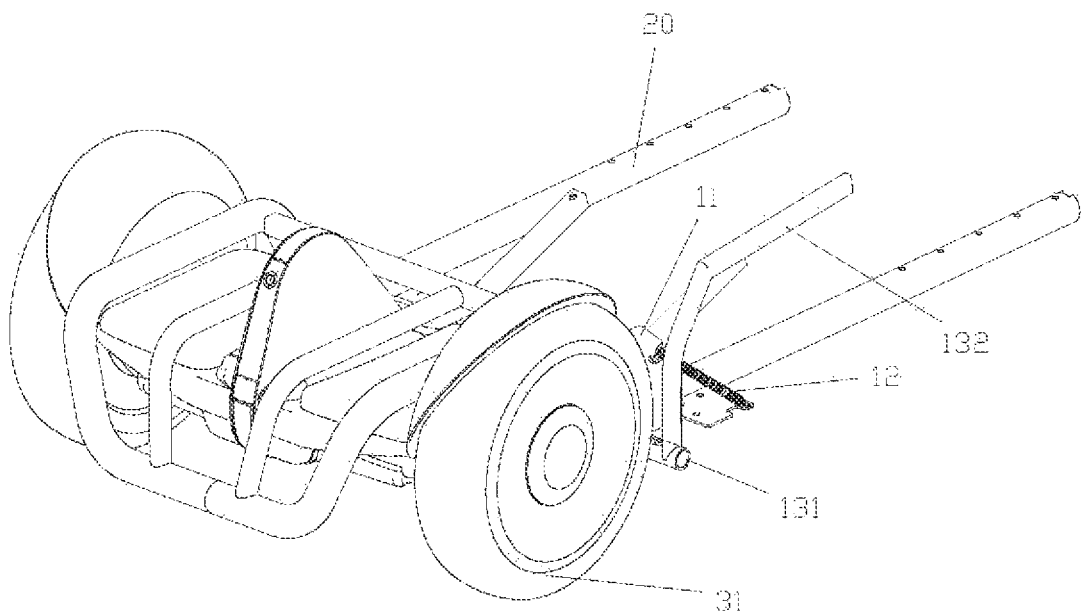
FIG. 4 illustrates a stereo diagram of a second viewing angle of a brake mechanism according to the disclosure.

As shown in FIG. 3 and FIG. 4, in allusion to a specific form of the elastic member 12, the elastic member 12 is a spring.

Figure 2:
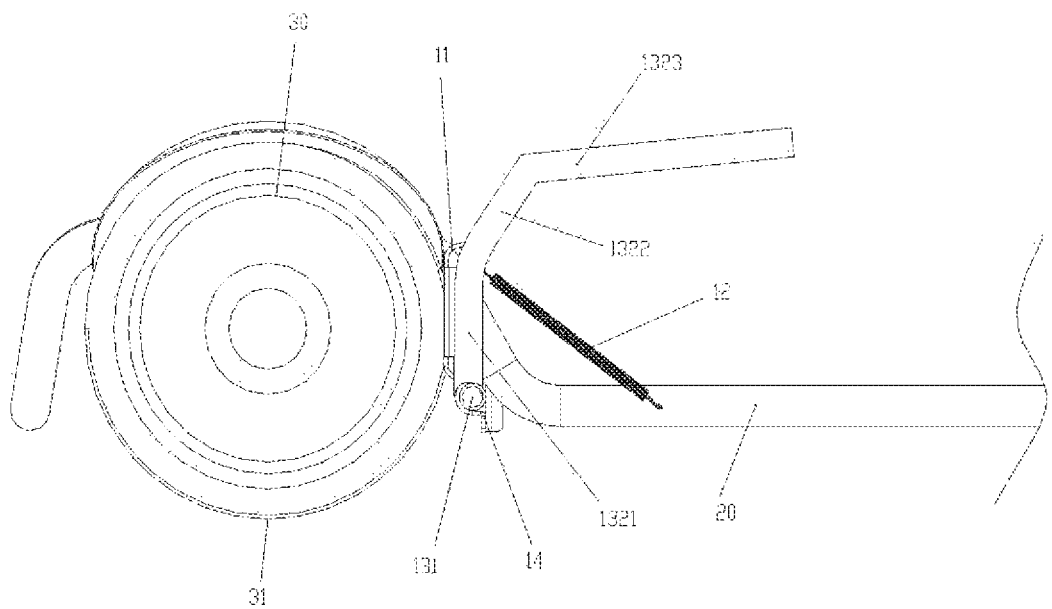
FIG. 2 illustrates a structure diagram of a brake pad of a brake mechanism according to the disclosure at a first position.

For enabling the brake pad 11 to have the first position and the second position, as shown in FIG. 1 and FIG. 2, the brake assembly 10 further includes a drive part 13. The drive part 13 is connected with the vehicle frame 20, wherein, the drive part 13 is connected with the brake pad 11 in a driving manner, to drive the brake pad 11 to move.

In an exemplary embodiment, the brake assembly 10 is provided with the drive part 13, wherein, the drive part 13 is connected with the vehicle frame 20.

In an exemplary embodiment, the drive part 13 is connected with the brake pad 11 in the driving manner, in this way, when the tire 31 needs to be braked, the drive part 13 drives the brake pad 11 to move, such that the brake pad 11 moves to first position which is in contact with the tire 31 from the second position which is separated from the tire 31, and the tire 31 stops under an action of the frictional force between the brake pad 11 and the tire 31.

In an exemplary embodiment, the drive part 13 is an automated power part, as an alternative, is a manual drive part.

In allusion to a specific connecting mode of the drive part 13, the drive part 13 is connected with the brake pad 11 fixedly, and is connected with the vehicle frame 20 rotatably.

In an exemplary embodiment, the drive part 13 is connected with the brake pad 11 fixedly. Correspondingly, for enabling the brake pad 11 to have the first position and the second position, the drive part 13 is connected with the vehicle frame 20 rotatably.

In an exemplary embodiment, when the tire 31 operates normally, the brake pad 11 is located at the second position which is separated from the tire 31. When the tire 31 needs to be braked, the brake pad 11 is driven by rotating the drive part 13 to rotate relative to the vehicle frame 20, such that the brake pad 11 is located at the first position which is in contact with the tire 31, and the tire 31 stops under an action of the frictional force between the brake pad 11 and the tire 31.

For enabling the drive part 13 to be rotatably connected with the vehicle frame 20, as shown in FIG. 1 and FIG. 2, the drive part 13 includes: a connecting shaft 131 connected with the vehicle frame 20 rotatably, and a drive rod 132 connected with the connecting shaft 131, wherein, a position of the drive rod 132 is adjustably provided, to drive the connecting shaft 131 to rotate relative to the vehicle frame 20.

In the embodiment, the drive part 13 consists of the connecting shaft 131 and the drive rod 132, wherein, the connecting shaft 131 is connected with the vehicle frame 20 rotatably, and the drive rod 132 is connected with the connecting shaft 131.

In the embodiment, the position of the drive rod 132 is adjustably provided, in this way the connecting shaft 131 is driven to rotate relative to the vehicle frame 20.

In an exemplary embodiment, the drive rod 132 is connected with the connecting shaft 131 in a welding manner.

In an exemplary embodiment, the drive rod 132 is connected with the connecting shaft 131 fixedly by a screw.

In an exemplary embodiment, the brake pad 11 is connected with the drive part 13 in a welding manner.

In an exemplary embodiment, the brake pad 11 is connected with the drive part 13 fixedly by a screw.

In an exemplary embodiment, when the tire 31 operates normally, the brake pad 11 is located at the second position which is separated from the tire 31. When the tire 31 needs to be braked, the connecting shaft 131 is driven by rotating the drive rod 132 to rotate relative to the vehicle frame 20. At the moment, the brake pad 11 rotates relative to the vehicle frame 20, such that the brake pad 11 is located at the first position which is in contact with the tire 31, and the tire 31 stops under an action of the frictional force between the brake pad 11 and the tire 31.

In allusion to a specific structure of the drive rod 132, as shown in FIG. 1 and FIG. 2, the drive rod 132 includes a first rod section 1321 connected with the connecting shaft 131, and a second rod section 1322 connected with one end of the first rod section 1321 far away from the connecting shaft 131, wherein, a first predetermined included angle is provided between the first rod section 1321 and the second rod section 1322, and the first predetermined included angle is an obtuse angle.

In an exemplary embodiment, the drive rod 132 consists of the first rod section 1321 and the second rod section 1322, wherein, the first rod section 1321 is connected with the connecting shaft 131, the second rod section 1322 is connected with the one end of the first rod section 1321 far away from the connecting shaft 131, the first predetermined included angle is provided between the first rod section 1321 and the second rod section 1322, and the first predetermined included angle is the obtuse angle.

For driving the drive rod 132 to rotate, as shown in FIG. 1 and FIG. 2, the drive rod 132 further includes a third rod section 1323. The third rod section 1323 is connected with the second rod section 1322, wherein, a second predetermined included angle is provided between the third rod section 1323 and the second rod section 1322, the second predetermined included angle is an obtuse angle, and the third rod section 1323 extends along a direction away from the tire 31.

In an exemplary embodiment, the drive rod 132 consists of the first rod section 1321, the second rod section 1322 and the third rod section 1323, the first rod section 1321 is connected with the connecting shaft 131, the second rod section 1322 is connected with the one end of the first rod section 1321 far away from the connecting shaft 131, and the third rod section 1323 is connected with the second rod section 1322.

In an exemplary embodiment, an extension position of the first rod section 1321 is consistent with an extension position of the brake pad 11, an extension direction of the second rod section 1322 is away from the tire 31, the first predetermined included angle is provided between the first rod section 1321 and the second rod section 1322, and the first predetermined included angle is the obtuse angle. Correspondingly, the third rod section 1323 extends along the direction away from the tire 31, the second predetermined included angle is provided between the third rod section 1323 and the second rod section 1322, and the second predetermined included angle is the obtuse angle.

In an exemplary embodiment, when the tire 31 operates normally, the brake pad 11 is located at the second position which is separated from the tire 31. When the tire 31 needs to be braked, the third rod section 1323 is directly pulled, and the connecting shaft 131 is driven by rotating the drive rod 132 to rotate relative to the vehicle frame 20. At the moment, the brake pad 11 rotates relative to the vehicle frame 20, such that the brake pad 11 is located at the first position which is in contact with the tire 31, and the tire 31 stops under an action of the frictional force between the brake pad 11 and the tire 31. When the brake pad 11 is in contact with the tire 31, the braking effect is generated. The greater pulling force is, the larger the contact area of the brake pad 11 and the tire 31 will be, and the greater the generated braking force will be. When the third rod section 1323 is released, the drive rod 132 returns to an original state upon being subjected to the pulling force of the elastic member 12.

For ensuring that the drive part 13 is stably provided on the vehicle frame 20, as shown in FIG. 1 and FIG. 2, the brake assembly 10 further includes a connecting part 14. The connecting part 14 is mounted onto the vehicle frame 20, and the drive part 13 is provided on the connecting part 14 rotatably.

In an exemplary embodiment, the brake assembly 10 is provided with the connecting part 14, wherein the connecting part 14 is mounted onto the vehicle frame 20. The drive part 13 is rotatably provided on the connecting part 14, in this way the drive part 13 is ensured to be stably provided on the vehicle frame 20 by the connecting part 14.

In an exemplary embodiment, the connecting part 14 is a fixed flange.

In an exemplary embodiment, the connecting part 14 is connected onto the vehicle frame 20 in a welding manner.

In an exemplary embodiment, the connecting part 14 is fixed on the vehicle frame 20 by a screw.

In an exemplary embodiment, the brake assembly 10 further includes the connecting part 14. The connecting part 14 is mounted onto the vehicle frame 20, the connecting shaft 131 is rotatably connected with the drive part 13, such that the connecting shaft 131 is rotatably provided by the connecting part 14 relative to the vehicle frame 20.

In an exemplary embodiment, the connecting part 14 includes a fixed block 141 and a chucking plate 142 cooperated with the fixed block 141, the fixed block 141 is connected with the vehicle frame 20 fixedly, the chucking plate 142 is detachably connected with the fixed block 141, and a chucking through hole allowing the connecting shaft 131 to pass through is formed between the chucking plate 142 and the fixed block 141, such that the connecting shaft 131 is rotatably provided on the vehicle frame 20.

In view of quantity of the tires 31, and for ensuring stability of a brake, the brake mechanism includes a plurality of brake pads 11 provided at intervals, and the plurality of the brake pads 11 are provided in one-to-one correspondence with a plurality of tires 31.

In the embodiment, the plurality of brake pads 11 is provided at intervals.

In the embodiment, the plurality of brake pads 11 is provided, namely, quantity of the brake pads 11 cooperates with the one of the tires 31, the plurality of brake pads 11 are provided at intervals, and the plurality of brake pads 11 are provided in one-to-one correspondence with the plurality of tires 31. During a specific braking process, each of the plurality of brake pad 11 is provided to be in contact with each of the plurality of tire 31, in this way the stability of the brake is ensured.

In the embodiment, the plurality of brake pads 11 are provided on the drive part 13 at intervals, and each of the plurality of brake pad 11 is provided to be in contact with the each of the plurality of tire 31 by driving of the drive part 13, in this way the stability of the brake is ensured.

In the embodiment, when the plurality of brake pads 11 are provided on the drive part 13 at intervals, the brake assembly 10 is provided with the elastic member 12. Wherein, the one end of the elastic member 12 is connected with one of the brake pads 11, another end is connect with the vehicle frame 20, and the elastic member 12 is telescopic, in this way the elastic member 12 returns to the original position when the tire 31 stops under an action of the frictional force of the brake pad 11 and the tire 31. At the moment, the brake pad 11 moves to the second position from the first position under an action of the elastic force of the elastic member 12.

In an exemplary embodiment, the brake mechanism includes a plurality of elastic members 12, and the plurality of elastic members 12 are sequentially connected with the plurality of brake pads 11, in this way the elastic member 12 returns to the original position when the tire 31 stops under an action of the frictional force between the brake pad 11 and the tire 31. At the moment, the each brake pad 11 moves to the second position from the first position under an action of the elastic force of the each elastic member 12.

In an exemplary embodiment, in allusion to the quantity of the brake pads 11, one brake pad 11 is provided when there are a plurality of tires 31, and the braking effect is achieved through contacting of the one brake pad 11 with one of the tires 31.

In allusion to one specific embodiment of the brake mechanism of the disclosure:

In the embodiment, the brake mechanism is a pull-rod handbrake system.

In an exemplary embodiment, a pull-rod handle (the drive part 13), a rotating shaft (the connecting shaft 131) and the brake pad 11 are fixed together, and a fixing mode includes, but is not limited to, fixation in the welding manner or by the screw.

The pull-rod handbrake system (the brake mechanism) is fixed on the vehicle frame 20 by the fixed flange (the connecting part 14), the brake system rotates around the rotating shaft, and the fixing mode includes, but is not limited to, fixation in the welding manner or through the screw.

In an exemplary embodiment, one end of a tension spring (the elastic member 12) is fixed on the brake pad 11, and another end is fixed on the vehicle frame 20.

In an exemplary embodiment, during the specific braking process of the tire 31, the brake pad 11 is in direct contact with the tire 31, thereby generating better brake effect.

In an exemplary embodiment, the brake pad 11 is made of the metal plate by bending, as an alternative, made from surface vulcanized rubber and other materials.

During use, a pull-rod handle part in an opening lever is directly pulled. On one hand, the frictional force between the brake pad 11 and the tire 31 is increased due to leverage. In this way, rotation of a wheel is obstructed, thereby playing a role of braking of the brake. On the other hand, because the brake pad 11 is kept for a distance away from the tire 31 when not used to brake, different models of tires 31 is adaptable, namely, different models of balance vehicles is adaptable.

During operation, a pull-rod handle is directly pulled, and the pull-rod handle drives an brake pad 11 on a pull rod. When the brake pad 11 is in contact with the tire 31, the braking effect is generated. The greater the pulling force is, the greater the contact area of the brake pad 11 and the tire 31 will be, and the greater the generated braking force will be. When the pull rod is released, the pull rod returns to an original state due to being subjected to tension of the tension spring.

The disclosure further provides a power platform, including a brake mechanism, a vehicle frame 20 and a power mechanism 30. The brake mechanism is the abovementioned brake mechanism and provided on the vehicle frame 20, and the power mechanism 30 is connected with the vehicle frame 20 in a driving manner.

In an exemplary embodiment, the power mechanism 30 includes at least two tires 31. Quantity of brake pads 11 of the brake mechanism is the same as that of the tires 31, and a plurality of the brake pads 11 are provided in one-to-one correspondence with the at least two tires 31.

In an exemplary embodiment, the power platform is a balance vehicle. During specific use, a drive part 13 is directly pulled. On one hand, frictional force between the brake pad 11 and the tire 31 is increased due to leverage. In this way, rotation of a wheel is obstructed, thereby playing a role of braking of a brake. On the other hand, because the brake pad 11 is kept for a distance away from the tire 31 when not used to brake, the brake pad 11 is adapted to different models of tires 31, namely, the brake mechanism is adapted to different models of balance vehicles.

In an exemplary embodiment, positions of the vehicle frame 20 and the power mechanism 30 are fixed relatively.

Some embodiments of the disclosure further provide a karting, including a power platform. The power platform is the abovementioned power platform.

In allusion to a brake system of the karting, namely, a brake mechanism in some embodiments of the disclosure, a disc brake mechanism and a drum brake mechanism are mainly taken at present. A brake mechanism known to the inventors is not excellently applied to the karting taking a dynamic balance vehicle as a platform due to spatial and product features. The brake mechanism of some embodiments of the disclosure is preferably adaptable to the karting taking the dynamic balance vehicle as the platform, and adaptable to the different models of balance vehicles.

From the description above, the abovementioned embodiments of the disclosure achieve the following technical effect.

The brake mechanism of the disclosure can better brake the tire 31 through the brake pad 11 on the brake assembly 10. During the specific use, the brake assembly 10 is mounted on the vehicle frame 20. When the tire 31 operates normally, the brake pad 11 is located at the second position separated from the tire 31. When the tire 31 needs to be braked, the position of the brake pad 11 is adjusted, such that the brake pad 11 is located at the first position which is in contact with the tire 31. At the moment, the tire 31 stops under an action of the frictional force between the brake pad 11 and the tire 31. The brake mechanism of the disclosure can better brake the tire 31 through the brake pad 11 on the brake assembly 10, thereby solving the problem that the brake mechanism known to inventors has the poor braking effect.

Some embodiments of the disclosure provide the brake mechanism, wherein the brake pad is in direct contact with the tire, thereby generating better braking effect. The whole apparatus is simple, with low cost and convenient maintenance. The whole apparatus occupies a small area and is adaptable to different models (different diameters of the tires mainly) of kartings taking the balance vehicles as the power platforms. The whole apparatus is simple to operate, and a user achieves braking by operating the pull rod of the handbrake. In addition, the braking effect is adjusted according to exerted force.

It is to be noted that terms "first", "second" and the like in the specification, claims and the abovementioned drawings of the application are used for distinguishing similar objects rather than describing a specific sequence or a precedence order. It is to be understood that the date used in such a way may be exchanged where appropriate, in order that the embodiments of the application described here may be implemented in a sequence other than sequences graphically shown or described here. In addition, terms "include" and "have" and any variations thereof are intended to cover non-exclusive inclusions. For example, a process, a method, a system, a product or a device including a series of operations or units is not limited to the operations or units which are expressly listed, but may alternatively further include operations or units which are not expressly listed or alternatively further include other operations or units intrinsic to the process, the method, the product or the device.

In order to facilitate description, a spatial relative term may be used here, such as "over", "above", "on an upper surface" and "on", to describe a spatial location relation between a device or a feature shown in the drawing and other devices or other features. It is to be understood that the spatial relative term aims at including different orientations of the device during use or operation outside the orientation described in the drawing. For example, if the device in the drawing is inverted, it may be described as that the device "above other devices or other structures" or "over other devices or other structures" shall be positioned "under other devices or other structures" or "below other devices or other structures". Therefore, an exemplary term "above" may include two orientations: "above" and "under". As an alternative, the device may be positioned with other different modes (90° rotation or positioned at other orientations), and the spatial relative description used here needs to be explained correspondingly.

In the description of the disclosure, it is to be understood that orientation or position relationships indicated by terms "front", "back", "upper", "lower", "left", "right", "transverse", "vertical", "horizontal", "top", "bottom" and the like are orientation or position relationships shown in the drawings usually, are adopted not to indicate or imply that indicated devices or components must be in specific orientations or structured and operated in specific orientations but only to conveniently describe the disclosure and simplify descriptions and thus should not be understood as limits to the scope of protection of disclosure. The orientation terms as "inner" and "outer" refer to the inside and the outside relative to an outline of each part.

The above is only preferred implementations of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A brake mechanism, comprising:
   a brake assembly, the brake assembly being mounted on a vehicle frame;
   the brake assembly comprising a brake pad, and a position of the brake pad being adjustably disposed, such that the brake pad has a first position and a second position;
   wherein, when the brake pad is located at the first position, the brake pad is in contact with a tire; and when the brake pad is located at the second position, the brake pad is separated from the tire;
   wherein, the brake pad is rotatably provided relative to the vehicle frame, such that the brake pad has the first position and the second position;
   wherein, the angle of the brake pad is adjustable, the greater an angle of rotation of the brake pad is, the larger a contact area between the brake pad and the tire will be, and the greater generated braking force will be;
   the brake assembly further comprises:
   a drive part connected with the vehicle frame;
   wherein, the drive part is connected with the brake pad in a driving manner, to drive the brake pad to move;
   the drive part is connected with the brake pad fixedly, and the drive part is connected with the vehicle frame rotatably;
   the drive part comprises:
   a connecting shaft, the connecting shaft being connected with the vehicle frame rotatably; and
   a drive rod, the drive rod being connected with the connecting shaft;
   wherein, a position of the drive rod is adjustably provided, to drive the connecting shaft to rotate relative to the vehicle frame;
   the drive rod comprises:
   a first rod section, the first rod section being connected with the connecting shaft; and
   a second rod section, the second rod section being connected with one end of the first rod section far away from the connecting shaft;
   wherein, a first predetermined included angle is provided between the first rod section and the second rod section, and the first predetermined included angle is an obtuse angle.

2. The brake mechanism as claimed in claim 1, wherein, when the brake pad is located at the first position, the brake pad is in contact with an outer tire surface of the tire.

3. The brake mechanism as claimed in claim 1, wherein, the brake assembly further comprises:
   an elastic member, one end of the elastic member being connected with the brake pad, and another end of the elastic member being connected with the vehicle frame, the elastic member being telescopic, to provide driving force driving the brake pad to move to the second position from the first position.

4. The brake mechanism as claimed in claim 3, wherein, the elastic member is a spring.

5. The brake mechanism as claimed in claim 1, wherein, the drive rod further comprises:
   a third rod section, the third rod section being connected with the second rod section;
   wherein, a second predetermined included angle is provided between the third rod section and the second rod section, the second predetermined included angle is an obtuse angle, and the third rod section extends along a direction away from the tire.

6. The brake mechanism as claimed in claim 1, wherein, the brake assembly further comprises:
   a connecting part, the connecting part mounted onto the vehicle frame, and the drive part being rotatably provided on the connecting part.

7. The brake mechanism as claimed in claim 1, wherein, the brake assembly further comprises:
   a connecting part, the connecting part being configured to be mounted onto the vehicle frame, the connecting shaft being rotatably connected with the drive part, such that the connecting shaft is rotatably provided by the connecting part relative to the vehicle frame.

8. The brake mechanism as claimed in claim 7, wherein, the connecting part comprises a fixed block and a chucking plate cooperating with the fixed block, the fixed block is connected with the vehicle frame fixedly, the chucking plate is detachably connected with the fixed block, and a chucking through hole allowing the connecting shaft to pass through is formed between the chucking plate and the fixed block, such that the connecting shaft is rotatably provided on the vehicle frame.

9. The brake mechanism as claimed in claim 1, wherein, the brake mechanism comprises a plurality of brake pads, the plurality of brake pads are provided at intervals, and the plurality of brake pads are provided in one-to-one correspondence with a plurality of tires.

10. The brake mechanism as claimed in claim 1, wherein, the brake mechanism comprises a plurality of brake pads, and the plurality of brake pads are provided at intervals.

11. A power platform, comprising a brake mechanism, a vehicle frame and a power mechanism, wherein the brake mechanism is the brake mechanism as claimed in claim 1, the brake mechanism is provided on the vehicle frame, and the power mechanism is connected with the vehicle frame in a driving manner.

12. The power platform as claimed in claim 11, wherein when the brake pad is located at the first position, the brake pad is configured to be in contact with an outer tire surface of the tire.

13. The power platform as claimed in claim 11, wherein, the power mechanism comprises at least two tires, quantity of brake pads of the brake mechanism is the same as that of the tires, and a plurality of the brake pads are provided in one-to-one correspondence with the at least two tires.

14. A karting, comprising a power platform, wherein, the power platform is the power platform as claimed in claim 11.

* * * * *